(12) United States Patent
Okazaki

(10) Patent No.: US 10,066,523 B2
(45) Date of Patent: Sep. 4, 2018

(54) BLOW-BY HEATER

(71) Applicant: NIFCO INC., Yokosuka-shi, Kanagawa (JP)

(72) Inventor: Tsuyoshi Okazaki, Yokosuka (JP)

(73) Assignee: NIFCO INC., Yokosuka-Shi, Kanagawa (JP)

( * ) Notice: Subject to any disclaimer, the term of this patent is extended or adjusted under 35 U.S.C. 154(b) by 160 days.

(21) Appl. No.: 15/116,684

(22) PCT Filed: Feb. 12, 2015

(86) PCT No.: PCT/JP2015/053776
§ 371 (c)(1),
(2) Date: Aug. 4, 2016

(87) PCT Pub. No.: WO2015/122438
PCT Pub. Date: Aug. 20, 2015

(65) Prior Publication Data
US 2016/0348549 A1 Dec. 1, 2016

(30) Foreign Application Priority Data
Feb. 12, 2014 (JP) .................... 2014-024699

(51) Int. Cl.
*F02B 25/06* (2006.01)
*F01M 13/00* (2006.01)
*F01M 13/04* (2006.01)
*F02M 35/10* (2006.01)
*F02M 25/06* (2016.01)

(52) U.S. Cl.
CPC ............ *F01M 13/00* (2013.01); *F01M 13/04* (2013.01); *F02M 25/06* (2013.01); *F02M 35/10222* (2013.01); *F01M 2013/0472* (2013.01); *Y02T 10/121* (2013.01)

(58) Field of Classification Search
CPC ................... F01M 13/00; F01M 13/04; F01M 2013/0472; F02M 25/06; F02M 35/1022; Y02T 10/121
USPC ....................................... 123/572–574, 41.86
See application file for complete search history.

(56) References Cited

U.S. PATENT DOCUMENTS

| 6,062,206 A | * | 5/2000 | Nelson | ................... F01M 13/00 |
| | | | | 123/573 |
| 6,601,572 B2 | | 8/2003 | Okamoto | |
| 8,205,604 B2 | * | 6/2012 | Velosa | ................. F01M 13/022 |
| | | | | 123/184.21 |

(Continued)

FOREIGN PATENT DOCUMENTS

| CN | 1252491 A | 5/2000 |
| DE | 202005012793 U1 | 12/2006 |

(Continued)

OTHER PUBLICATIONS

Europe Patent Office, "Search Report for European Patent Application No. 15748920.4," dated Oct. 17, 2017.

(Continued)

*Primary Examiner* — Marguerite McMahon
(74) *Attorney, Agent, or Firm* — Manabu Kanesaka

(57) ABSTRACT

A blow-by heater includes a tube member allowing a blow-by gas to flow through, and opening in a downstream side, and the tube member is formed such that a thickness of the downstream side decreases toward an opening end.

6 Claims, 3 Drawing Sheets

(56) References Cited

U.S. PATENT DOCUMENTS

| | | | | |
|---|---|---|---|---|
| 2006/0144376 A1* | 7/2006 | Gschwind | ............ | F01M 13/00 |
| | | | | 123/573 |
| 2007/0186913 A1* | 8/2007 | Ideguchi | ............... | F01M 13/04 |
| | | | | 123/574 |
| 2008/0092864 A1* | 4/2008 | Suzuki | ................ | F01M 13/023 |
| | | | | 123/574 |
| 2008/0099000 A1* | 5/2008 | Suzuki | .............. | F01M 13/0011 |
| | | | | 123/574 |
| 2015/0354420 A1* | 12/2015 | Kira | ....................... | F02F 7/006 |
| | | | | 123/574 |

FOREIGN PATENT DOCUMENTS

| | | | | |
|---|---|---|---|---|
| DE | 202012003302 U1 * | 1/2013 | ............ | F02M 35/10 |
| EP | 1207279 A1 | 5/2002 | | |
| JP | H09-088540 A | 3/1997 | | |
| JP | H10-103040 A | 4/1998 | | |
| JP | 2006-063884 A | 3/2006 | | |
| JP | 2008-303833 A | 12/2008 | | |
| JP | 2009-209813 A | 9/2009 | | |
| JP | 2012-215137 A | 11/2012 | | |
| JP | 2013-130102 A | 7/2013 | | |

OTHER PUBLICATIONS

PCT International Search Report of PCT/JP2015/053776.
China Patent Office, "Office Action for Chinese Patent Application No. 201580008054.5," dated Feb. 23, 2018.

\* cited by examiner

BLOW-BY HEATER

RELATED APPLICATIONS

The present application is National Phase of International Application No. PCT/JP2015/053776 filed Feb. 12, 2015, and claims priority from Japanese Application No. 2014-024699, filed Feb. 12, 2014, the disclosure of which is hereby incorporated by reference herein in its entirety.

FIELD OF TECHNOLOGY

The present invention relates to a blow-by heater heating a blow-by gas of an engine, and preventing moisture and the like contained in the blow-by gas from attaching to or freezing at an inner wall portion of a pipe line.

BACKGROUND ART

In order to avoid environmental pollution, the blow-by gas of the engine is circulated to a gas-intake route of the engine without ejecting the blow-by gas of the engine to the atmosphere. Then, in such a blow-by-gas-circulation pipe line, in order to prevent the moisture and the like contained in the blow-by gas from attaching to or freezing at the inner wall portion of the pipe line, conventionally, there is widely used a blow-by gas heater.

FIG. 6 is a schematic perspective view showing a conventional blow-by gas heater (corresponding to FIG. 11 of Japanese Patent Application Publication No. 2012-215137), and FIG. 7 is a schematic cross-sectional view showing an example wherein the blow-by gas heater in FIG. 6 is provided in a blow-by-gas circulation passage (corresponding to FIG. 9 of the Japanese Patent Application Publication No. 2012-215137).

As shown in FIG. 6 and FIG. 7, a metal pipe 55 which becomes a passage of the blow-by gas includes a smooth wall portion 55d and a partially cylindrical wall portion 55e (see FIG. 6). Therefore, a cross-sectional opening shape of the metal pipe 55 has a partially circular shape. A tip of the smooth wall portion 55d and a tip of the partially cylindrical wall portion 55e form a common opening end face of the metal pipe 55, and a whole tip of the smooth wall portion 55d becomes a last portion 55c of an opening face of the metal pipe 55, and a center portion of the tip of the partially cylindrical wall portion 55e becomes a forefront portion 55b of the opening face of the metal pipe 55 (see FIG. 6 and FIG. 7). The smooth wall portion 55d is disposed in such a way as to face a heating source 56 which is an electronic ceramic heater through a heating-source attachment pipe 54. In the heating source 56, electric power is supplied through a plug member 57.

Also, the metal pipe 55 includes a throttle portion 55f formed such that a cross-sectional opening area thereof becomes smaller toward a tip side.

As shown in FIG. 7, a protruding portion 55a of the metal pipe 55 is disposed in such a way as to protrude to a gas-intake-passage axis-line side al more than to an inner wall face 61d in a connecting pipe 61. Moisture or oil of the blow-by gas attached to the metal pipe 55 flows to a tip side thereof (downward) through the protruding portion 55a so as to promote the moisture or oil of the blow-by gas to become a water droplet or an oil droplet.

SUMMARY OF THE INVENTION

When moisture or oil of a blow-by gas becomes a water droplet or an oil droplet, even in a case wherein the water droplet or the oil droplet freezes and the like thereafter, if an ice block thereof has a small volume, it is possible to suppress damages and the like of, for example, a turbo impeller. The smaller a size of the water droplet or the oil droplet is, the more significant an effect thereof becomes.

The present inventor has diligently considered a shape of an opening end of a blow-by gas heater, and found that the size of the water droplet or the oil droplet (a splash) can be significantly reduced compared to a structure described in Japanese Patent Application Publication No. 2012-215137.

The present invention is invented based on the aforementioned knowledge. An object of the present invention is to provide a blow-by gas heater which can significantly reduce the size of the water droplet or the oil droplet (the splash) of the moisture or oil and the like included in the blow-by gas.

The present invention is a blow-by heater comprising a tube member allowing a blow-by gas to flow through, and opening in a downstream side, and the tube member is formed such that a thickness of the downstream side decreases toward the opening end.

According to the present invention, a thickness of the tube member allowing the blow-by gas to flow through is formed so as to reduce the thickness toward the opening end, so that in an opening end face of the tube member, an area where the moisture or the oil can remain is small so as to reduce a remaining amount of the moisture or the oil in the opening end face. As a result, the size of the water droplet or the oil droplet scattered from the opening end face is significantly reduced. Thereby, even in a case wherein the scattered water droplet or oil droplet freezes and the like thereafter, the ice block thereof has a small volume so as to suppress the damages and the like of, for example, the turbo impeller.

Preferably, the tube member is formed such that a thickness of a whole circumferential edge of the downstream side decreases toward the opening end. In that case, the remaining amount of the moisture or the oil in a whole circumference of the opening end face is reduced, so that the size of the water droplet or the oil droplet scattered from the opening end face is significantly reduced in the whole circumference of the opening end face.

Generally, for example, the tube member is formed by a metal pipe including a portion (a throttle portion) wherein a cross-sectional area thereof decreases toward the downstream side. For example, such metal pipe can be formed by processing a metal plate formed by press punching into a tube shape.

Then, as a specific example wherein the thickness of the downstream side of the metal pipe which is the tube member decreases toward the opening end, for example, in an inner circumferential side in a vicinity of the opening end of the metal pipe, there is formed a slope face portion such that a thickness in the vicinity of the opening end decreases toward the opening end.

Even in that case, preferably, in a whole circumferential edge on the inner circumferential side in the vicinity of the opening end of the metal pipe, there is formed the slope face portion such that a thickness of a whole circumferential edge in the vicinity of the opening end decreases toward the opening end. In that case, the remaining amount of the moisture or the oil in the whole circumference of the opening end face is reduced, so that the size of the water droplet or the oil droplet scattered from the opening end face is significantly reduced in the whole circumference of the opening end face.

The slope face portion may include a cross-sectional linear surface portion, or a cross-sectional curved surface portion. In a case wherein the slope face portion includes the cross-sectional curved surface portion, it is preferable to continue smoothly (without forming a corner portion) from an inner circumferential face of the metal pipe. In that case, the moisture or the oil inside the metal pipe can be smoothly guided further toward the opening end from the inner circumferential face of the metal pipe. On the other hand, even in a case wherein the slope face portion includes the cross-sectional curved surface portion, in the opening end side, it is preferable to form the corner portion together with an outer circumferential face of the metal pipe. In that case, due to an action of a surface tension in the corner portion, splashing of the moisture or the oil in the corner portion is promoted (it is difficult to remain) so as to reduce the size of the water droplet or the oil droplet further significantly.

BEST MODES OF CARRYING OUT THE INVENTION

Hereinafter, with reference to the attached drawings, an embodiment of the present invention will be explained in detail.

Figure 1:
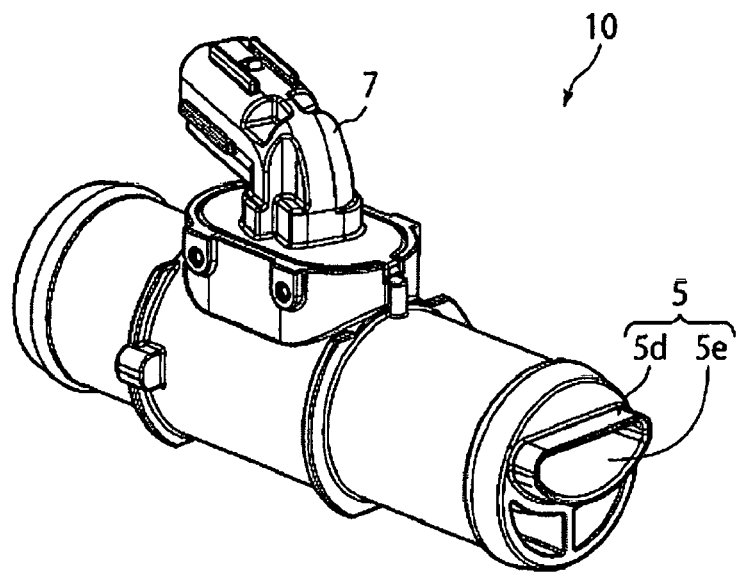
FIG. 1 is a schematic perspective view showing a blow-by gas heater of one embodiment of the present invention.
Figure 2:
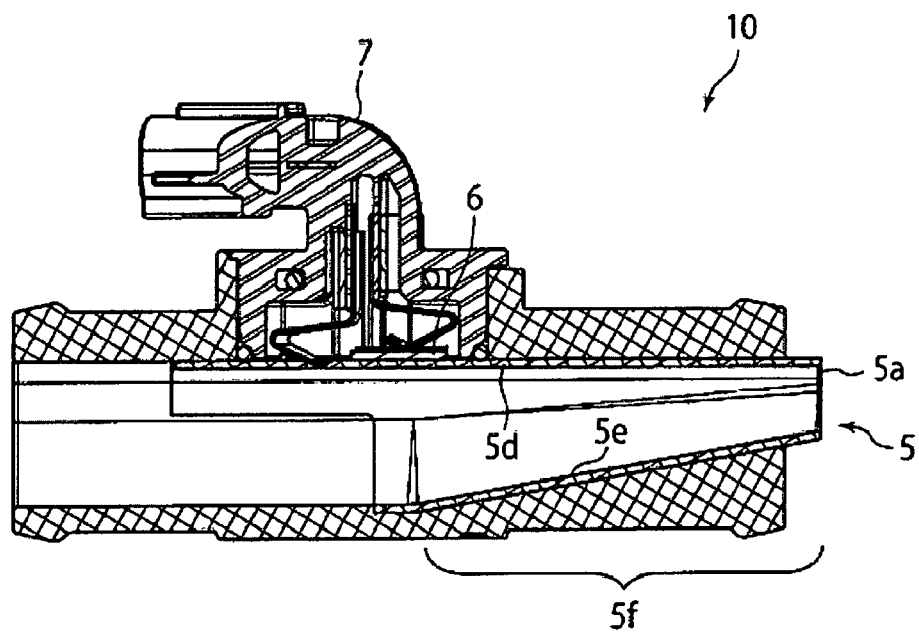
FIG. 2 is a schematic cross-sectional view of the blow-by gas heater in FIG. 1.
Figure 3:
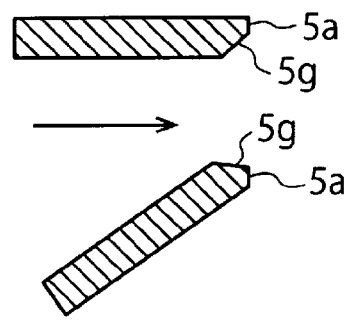
FIG. 3 is a schematic cross-sectional view showing a shape of a vicinity of an opening end of a metal pipe of the blow-by gas heater in FIG. 1.

FIG. 1 is a schematic perspective view showing a blow-by gas heater of one embodiment of the present invention; FIG. 2 is a schematic cross-sectional view of the blow-by gas heater in FIG. 1; and FIG. 3 is a schematic cross-sectional view showing a shape of a vicinity of an opening end of a metal pipe of the blow-by gas heater in FIG. 1.

As shown in FIG. 1 and FIG. 2, in a blow-by gas heater 10 of one embodiment of the present invention, a metal pipe 5 which becomes a passage of a blow-by gas includes a smooth wall portion 5d and a curved wall portion 5e (see FIG. 1). A cross-sectional opening shape of the metal pipe 5 has an approximately half-moon shape. A whole tip of the smooth wall portion 5d, and a tip of the curved wall portion 5e form a common opening end face 5a of the metal pipe 5 (see FIG. 2). The smooth wall portion 5d is disposed in such a way as to directly face a heating source 6 which is an electronic ceramic heater. In the heating source 6, there is supplied electric power through a plug member 7. Also, the metal pipe 5 includes a throttle portion 5f formed such that a cross-sectional opening area thereof becomes smaller toward a tip side.

The opening end face 5a of the metal pipe 5 is disposed in such a way as to protrude into a gas-intake passage pipe (not shown in the drawings).

Moisture or oil of the blow-by gas attached to the metal pipe 5 is guided up to the opening end face 5a so as to become a water droplet or an oil droplet in the opening end face 5a, and scatter into an air flow flowing inside the gas-intake passage pipe (not shown in the drawings).

In the present embodiment, a thickness of a downstream side of the metal pipe 5 is formed in such a way as to decrease toward the opening end face 5a. Specifically, as shown in FIG. 3, in an inner circumferential side in a vicinity of the opening end face 5a of the metal pipe 5, there is formed a slope face portion 5g such that a thickness in the vicinity of the opening end face 5a decreases toward the opening end face 5a. As shown in FIG. 3, in the present embodiment, the slope face portion 5g includes a cross-sectional linear surface portion.

According to the present embodiment as described above, a thickness of the metal pipe 5 allowing the blow-by gas to flow through is formed in such a way as to decrease toward the opening end face 5a, so that in the opening end face 5a of the metal pipe 5, an area where the moisture or the oil can remain is small so as to reduce a remaining amount of the moisture or the oil in the opening end face 5a. As a result, a size of the water droplet or the oil droplet scattered from the opening end face 5a is significantly reduced. Thereby, even in a case wherein the scattered water droplet or oil droplet freezes and the like thereafter, an ice block thereof has a small volume so as to suppress damages and the like of, for example, a turbo impeller.

Incidentally, in the present embodiment, preferably, the slope face portion 5g is formed in a whole circumferential edge on the inner circumferential side in the vicinity of the opening end face 5a of the metal pipe 5 such that a thickness of a whole circumferential edge in the vicinity of the opening end face 5a decreases toward the opening end face 5a. In that case, the remaining amount of the moisture or the oil in a whole circumference of the opening end face 5a is reduced, so that the size of the water droplet or oil droplet scattered from the opening end face 5a is significantly reduced in the whole circumference of the opening end face 5a.

Figure 4:
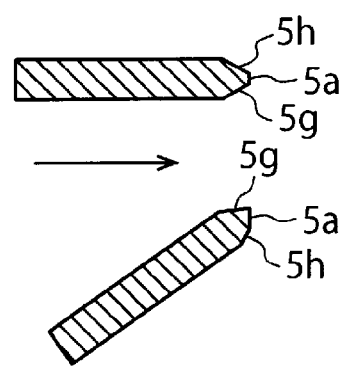
FIG. 4 is a schematic cross-sectional view showing another example of the shape of the vicinity of the opening end of the metal pipe.

Next, FIG. 4 is a schematic cross-sectional view showing another example of the shape of the vicinity of the opening end of the metal pipe 5. In an example shown in FIG. 4 which is different from an example shown in FIG. 3, there are respectively formed the slope face portion 5g and a slope face portion 5h on both of the inner circumferential side and an outer circumferential side in the vicinity of the opening end face 5a of the metal pipe 5.

Even in such an example, in the opening end face 5a of the metal pipe 5, the area where the moisture or the oil can remain is small, and the remaining amount of the moisture or the oil in the opening end face 5a is reduced, so that the size of the water droplet or oil droplet scattered from the opening end face 5a is significantly reduced. Thereby, even in the case wherein the scattered water droplet or oil droplet freezes and the like thereafter, the ice block thereof has the small volume so as to suppress the damages and the like of, for example, the turbo impeller.

According to experiments by the present inventor, an excellent splashing can be obtained provided that an angle is set up to approximately 45 degrees with reference to the opening end face 5a of the metal pipe 5 per an inclination angle of the slope face portion 5g and the slope face portion 5h.

Figure 5:
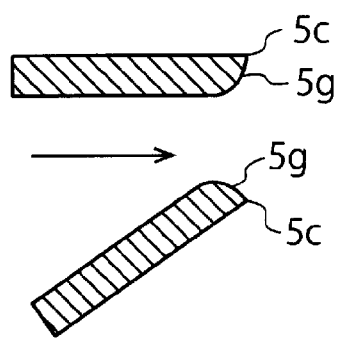
FIG. 5 is a schematic cross-sectional view further showing another example of the shape of the vicinity of the opening end of the metal pipe.
Figure 6:
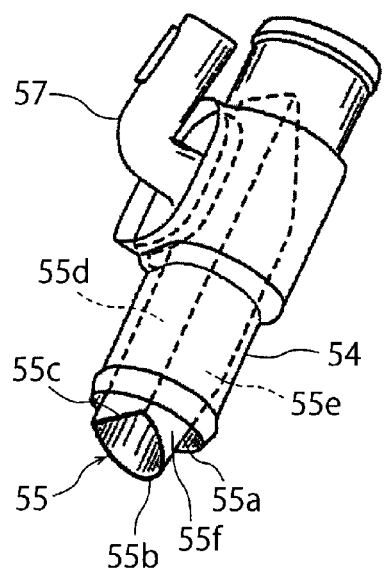
FIG. 6 is a schematic perspective view showing a conventional blow-by gas heater (FIG. 11 of Japanese Patent Application Publication No. 2012-215137).
Figure 7:
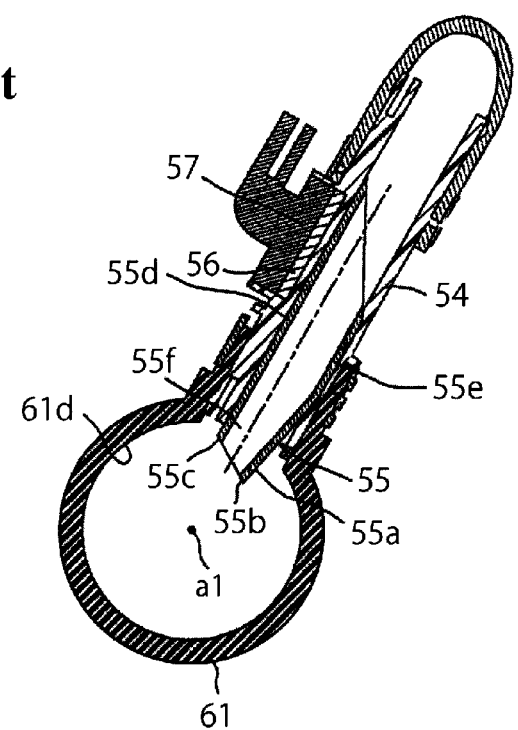
FIG. 7 is a schematic cross-sectional view showing an example wherein the blow-by gas heater in FIG. 6 is provided in a blow-by-gas circulation passage (FIG. 9 of the Japanese Patent Application Publication No. 2012-215137).

Next, FIG. 5 is a schematic cross-sectional view further showing another example of the shape of the vicinity of the opening end of the metal pipe 5. In an example shown in FIG. 5 which is different from the example shown in FIG. 3, the slope face portion 5g includes a cross-sectional curved surface portion. More specifically, in the example shown in FIG. 5, while the slope face portion 5g continues smoothly (without forming a corner portion) from an inner circumferential face of the metal pipe 5, the slope face portion 5g forms a corner portion 5c together with an outer circumferential face of the metal pipe 5.

In such an example, the moisture or the oil inside the metal pipe 5 can be smoothly guided further from the inner circumferential face of the metal pipe 5, and due to an action of a surface tension in the corner portion 5c, splashing of the moisture or the oil in the corner portion 5c is promoted (it is difficult to remain) so as to reduce the size of the water droplet or the oil droplet further significantly.

Incidentally, a tube member is not limited to the tube member formed by processing a metal plate formed by press punching into a tube shape, and may be a tube member made of metal molded by die casting, or made of resin having high thermal conductivity molded by injection molding.

EXPLANATION OF SYMBOLS 10 a blow-by gas heater
5 a metal pipe
5a an opening end face
5d a smooth wall portion
5e a curved wall portion
5f a throttled portion
5g a slope face portion
5h a slope face portion
6 a heating source
7 a plug member
54 a heating-source attachment pipe
55 a metal pipe
55a a protruding portion
55b a forefront portion
55c a last portion
55d a smooth wall portion
55e a partially cylindrical wall portion
55f a throttled portion
56 a heating source
57 a plug member
61 a connecting pipe
61d an inner wall face

What is claimed is:

1. A blow-by heater, comprising:
a tube member allowing a blow-by gas to flow therethrough in a flow direction, and being opened in a downstream side of the flow direction, the tube member having a metal pipe including
an opening end on the downstream side, and
an opening end vicinity having a cross-sectional area decreasing toward the opening end, and a slope face portion formed on an inner circumferential side of the opening end vicinity such that a wall thickness of a whole circumferential edge of the metal pipe in the opening end vicinity decreases toward the opening end.

2. A blow-by heater according to claim 1, wherein the slope face portion includes a cross-sectional curved surface portion forming a continuous curvature in the opening end vicinity to the opening end.

3. A blow-by heater according to claim 2, wherein the slope face portion further includes a corner portion together with an outer circumferential face of the metal pipe.

4. A blow-by heater according to claim 1, wherein the metal pipe is formed by processing a metal plate formed by press punching into a tube shape.

5. A blow-by heater according to claim 1,
wherein the metal pipe further includes
a smooth wall portion extending in the flow direction, and
a curved wall portion extending in the flow direction and integrally formed to the smooth wall portion to form the tube member, the curved lower wall portion being inclined toward the downstream side in respect to the smooth wall portion so that the cross-sectional area of the portion of the metal pipe decreases toward the opening end, and
the opening end includes an opening end face facing the downstream side, and the slope face portion is formed on the smooth wall portion and the curved wall portion and is inclined in respect to the opening end face so that the wall thickness of the metal pipe in the opening end vicinity decreases toward the opening end.

6. A blow-by heater according to claim 5, wherein the open end vicinity of the metal pipe further includes an outer slope face portion on an outer circumferential side in the opening end vicinity, the outer slope face portion being inclined in respect to the opening end face so that the wall thickness of the metal pipe in the opening end vicinity decreases toward the opening end, and
the opening end face is formed between the outer slope face portion and the slope face portion.

* * * * *